US012692401B2

(12) United States Patent
Beeram et al.

(10) Patent No.: US 12,692,401 B2
(45) Date of Patent: Jul. 28, 2026

(54) PEELABLE, PAINTABLE COMPOSITION FOR BASECOATS AND ARCHITECTURAL COATINGS

(71) Applicant: BEHR PROCESS CORPORATION, Santa Ana, CA (US)

(72) Inventors: China Ramanaiah Beeram, Punawale (IN); Dhanashree Havele, Hamburg (DE); Sadreddin Hosseini, Laguna Niguel, CA (US); Sujan Mandal, West Bengal (IN); Kyle Evan Rosenkoetter, Chantilly, VA (US); Mansi Sali, Maharashtra (IN); Claudia Paola Sarkisian, Newport Beach, CA (US); Gregory A. Williams, Laguna Beach, CA (US); Chenming Xue, Tustin, CA (US)

(73) Assignee: Behr Process Corporation, Santa Ana, CA (US)

( * ) Notice: Subject to any disclaimer, the term of this patent is extended or adjusted under 35 U.S.C. 154(b) by 826 days.

(21) Appl. No.: 17/963,508

(22) Filed: Oct. 11, 2022

(65) Prior Publication Data

US 2024/0117201 A1     Apr. 11, 2024

(51) Int. Cl.
| | |
|---|---|
| *C09D 5/20* | (2006.01) |
| *C08K 5/52* | (2006.01) |
| *C09D 7/63* | (2018.01) |
| *C09D 107/02* | (2006.01) |
| *C09D 109/06* | (2006.01) |
| *C09D 109/08* | (2006.01) |
| *C09D 125/10* | (2006.01) |
| *C09D 125/14* | (2006.01) |
| *C09D 129/04* | (2006.01) |
| *C09D 133/08* | (2006.01) |
| *C09D 133/10* | (2006.01) |
| *C09D 183/04* | (2006.01) |

(52) U.S. Cl.
CPC ................. *C09D 5/20* (2013.01); *C08K 5/52* (2013.01); *C09D 7/63* (2018.01); *C09D 107/02* (2013.01); *C09D 109/06* (2013.01); *C09D 109/08* (2013.01); *C09D 125/10* (2013.01); *C09D 125/14* (2013.01); *C09D 129/04* (2013.01); *C09D 133/08* (2013.01); *C09D 133/10* (2013.01); *C09D 183/04* (2013.01)

(58) Field of Classification Search
CPC ...... C09D 5/20; C09D 107/00; C09D 107/02; C09D 183/04; C09D 183/12; C09D 109/06; C09D 109/08; C09D 123/0853; C09D 125/10; C09D 125/14; C09D 129/04; C09D 133/08; C09D 133/10; C08L 83/12
See application file for complete search history.

(56) References Cited

U.S. PATENT DOCUMENTS

| | | | |
|---|---|---|---|
| 4,146,511 A | 3/1979 | Moriya et al. | |
| 6,110,525 A | 8/2000 | Stoddard | |
| 6,713,522 B2 | 3/2004 | Zhang et al. | |
| 6,822,012 B1 | 11/2004 | Baumgart et al. | |
| 6,964,919 B2 * | 11/2005 | Kloster | H10W 20/062 |
| | | | 438/626 |
| 6,964,989 B1 | 11/2005 | Fang et al. | |
| 6,991,851 B2 | 1/2006 | Krepski et al. | |
| 8,252,373 B2 * | 8/2012 | Song | B41M 5/5218 |
| | | | 428/32.33 |
| 8,263,231 B2 | 9/2012 | Mesa | |
| 8,524,825 B2 | 9/2013 | Register et al. | |
| 8,772,358 B2 | 7/2014 | Baseeth et al. | |
| 9,273,214 B1 | 3/2016 | Figliozzi | |
| 9,909,016 B2 | 3/2018 | Fontaine | |
| 10,053,586 B2 | 8/2018 | Fontaine | |
| 10,190,004 B2 | 1/2019 | Bone et al. | |
| 10,294,376 B2 | 5/2019 | Baseeth et al. | |
| 10,472,526 B2 | 11/2019 | Sarkis et al. | |
| 10,487,220 B2 | 11/2019 | Fontaine | |
| 11,739,224 B2 * | 8/2023 | Xue | C08K 3/013 |
| | | | 106/287.19 |
| 2010/0068502 A1 | 3/2010 | Kim | |
| 2017/0226348 A1 | 8/2017 | Gregg et al. | |
| 2018/0022931 A1 * | 1/2018 | Reimann | C09D 191/06 |
| | | | 427/372.2 |
| 2018/0179402 A1 | 6/2018 | Piecha et al. | |

FOREIGN PATENT DOCUMENTS

| | | | |
|---|---|---|---|
| EP | 2604349 B1 | | 7/2015 |
| EP | 3414297 A1 | | 12/2018 |
| EP | 2365978 B1 | | 9/2019 |
| EP | 3207097 B1 | | 12/2019 |
| EP | 2914385 B1 | | 4/2020 |
| JP | 09-77609 | * | 3/1997 |
| JP | 09-241541 | * | 9/1997 |
| WO | 2017/106207 A1 | | 6/2017 |

OTHER PUBLICATIONS

Machine translation of JP 09-241541 (no date).*

* cited by examiner

*Primary Examiner* — Marc S Zimmer
(74) *Attorney, Agent, or Firm* — Brooks Kushman P.C.

(57) ABSTRACT

A peelable paint composition includes a release agent having a component selected from the group consisting of soy lecithin, a polysiloxane, silicone polyether, and combinations thereof. The peelable paint composition further includes a film-forming resin that includes a component selected from the group consisting of natural rubber, styrene-butadiene copolymer, polyvinyl butyral, a vinyl acetate-ethylene copolymer, vinyl acrylic copolymer that includes styrene, acrylic styrene copolymer, and combinations thereof. The peelable paint composition can further include a number of optional additives. Water makes up the balance of the paint composition.

32 Claims, 1 Drawing Sheet

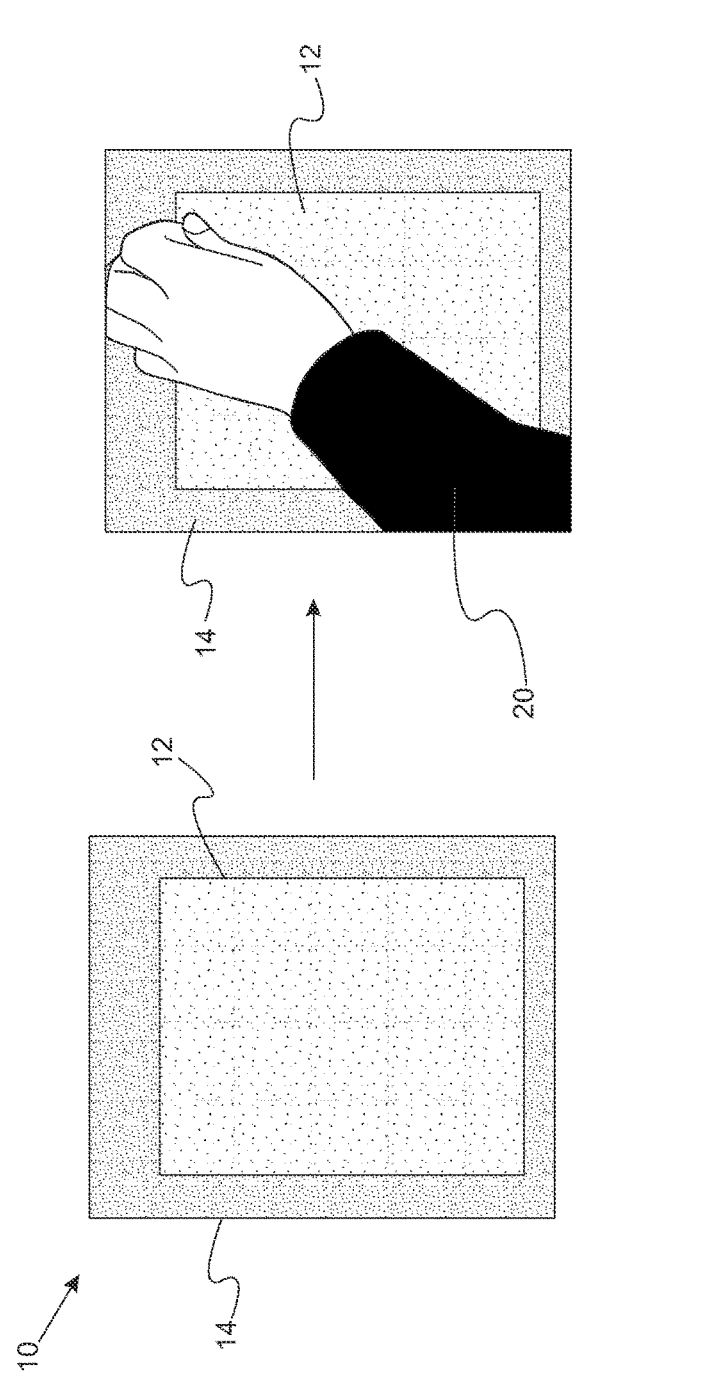
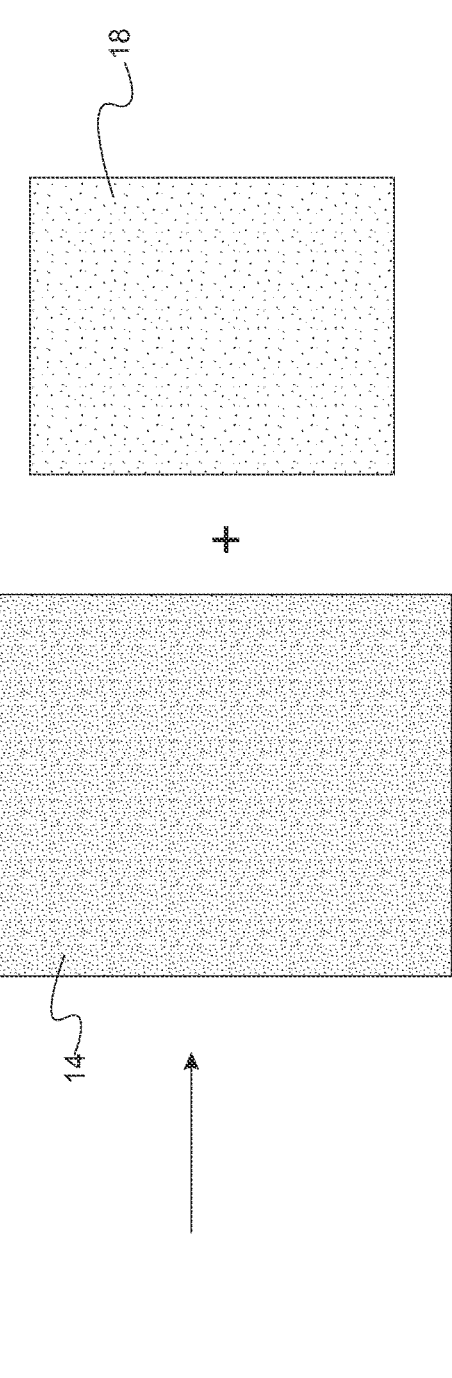

PEELABLE, PAINTABLE COMPOSITION FOR BASECOATS AND ARCHITECTURAL COATINGS

TECHNICAL FIELD

In at least one aspect, the present invention is related to paint compositions that form peelable coatings on a substrate.

BACKGROUND

Peelable paint compositions allow for a substrate to be coated with a temporary paint coating that can be removed when desired. Some prior art peelable paint compositions deploy a two coats system in which a first coat is applied on the substrate as a sealer with a peelable second coat applied over the first coat can be peelable. Many currently available peelable compositions are solvent-based spray-able paint for automobile coatings for temporary color change. Moreover, prior art peelable composition tend to only work over smooth, nonporous substrates.

Accordingly, there is a need for improved low VOC peelable paint compositions that can be used for a basecoat or to coat architectural walls.

SUMMARY

In at least one aspect, the present invention provides a peelable paint composition for forming a peelable coating on a substrate. The peelable paint composition includes a release agent having a component selected from the group consisting of soy lecithin, a polysiloxane, silicone polyether, and combinations thereof. The peelable paint composition further includes a film-forming resin that includes a component selected from the group consisting of styrene-butadiene copolymer, polyvinyl butyral, a vinyl acetate-ethylene copolymer, vinyl acrylic copolymer that includes styrene, acrylic styrene copolymer, and combinations thereof. The peelable paint composition can further include a number of optional additives. Water makes up the balance of the paint composition.

In another aspect, a peelable paint composition that can be applied to any previously painted substrate (with an emphasis on drywall for interior walls) is provided. Advantageously, the composition, which upon drying, can then be removed with minimal residual damage to the underlying substrate. Additionally, the basecoat can be painted with any type of topcoat.

In another aspect, a peelable paint composition for forming a peelable coating on a substrate is provided. The peelable paint composition includes natural rubber as a film-forming resin, a polysiloxane; and water.

In another aspect, the peelable paint composition can be provided as a 1-can product with a single SKU number In another aspect, the peelable paint composition can be made at a reduced cost with reduced or no titanium oxide.

In another aspect, a peelable paint composition for forming architectural coatings is provided. The peelable paint composition includes water, a polyether functional polydimethylsiloxane, or silicone polyether, and a film-forming resin that includes a component selected from the group consisting of styrene-butadiene copolymer, polyvinyl butyral, and combinations thereof. The peelable paint composition can form a film on the pre-painted architectural surface by brushing or rolling. Advantageously, the film adheres well on the substrate and forms a solid film after being dried that can then be peeled manually in large pieces without generating cracks or breaking into small pieces.

In still another aspect, a method for applying the peelable paint compositions set forth herein is provided. The method includes a step of applying a peelable paint composition to a target substrate to form a coated substrate and allowing the coated substrate to dry. The peelable paint composition includes a release agent having a component selected from the group consisting of soy lecithin, a polysiloxane, silicone polyether, and combinations thereof. The peelable paint composition further includes a film-forming resin that includes a component selected from the group consisting of styrene-butadiene copolymer, polyvinyl butyral, a vinyl acetate-ethylene copolymer, vinyl acrylic copolymer that includes styrene, acrylic styrene copolymer, and combinations thereof. The peelable paint composition can further include a number of optional additives. Water makes up the balance of the paint composition.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIGURE. Schematic flowchart showing the peelability of a paint coating formed by peelable paint compositions.

DETAILED DESCRIPTION

Reference will now be made in detail to presently preferred compositions, embodiments and methods of the present invention, which constitute the best modes of practicing the invention presently known to the inventors. The FIGURES are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups, $M^+$ is a metal ion, and $L^-$ is a negatively charged counter ion; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-$ $M^+$, $-CF_2H$, $-CF_2R'$, $-CFH_2$, and $-CFR'R''$ where R', R'' and R''' are $C_{1-10}$ alkyl or $C_{6-18}$ aryl groups, $M^+$ is a metal ion, and $L^-$ is a negatively charged counter ion; when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e., the range from 95 to 105. Generally, when the term "about" is used, it can be expected that similar results or effects according to the invention can be obtained within a range of +/−5% of the indicated value.

As used herein, the term "and/or" means that either all or only one of the elements of a said group may be present. For example, "A and/or B" shall mean "only A, or only B, or both A and B." In the case of "only A," the term also covers the possibility that B is absent, i.e., "only A, but not B."

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

The term "one or more" means "at least one" and the term "at least one" means "one or more." The terms "one or more" and "at least one" include "plurality" and "multiple" as a subset. In a refinement, "one or more" includes "two or more."

The term "resin" refers to the binder that holds the pigment particles and other solid components (e.g., fillers) together and provides adhesion to the surface painted Throughout this application, where publications are referenced, the disclosures of these publications in their entireties are hereby incorporated by reference into this application to more fully describe the state of the art to which this invention pertains.

Abbreviations:

"BUI" means Behr Ultra Interior.

"PVB" means polyvinyl butyral.

"PVC" means polyvinyl chloride.

"SKU" means Stock Keeping Unit.

"VOC" means volatile organic compounds.

In an embodiment, a peelable paint composition for forming a peelable coating on a substrate is provided. The peelable paint composition includes water, a release agent, and a film-forming resin that includes a component selected from the group consisting of natural rubber, styrene-butadiene copolymer, polyvinyl butyral, a vinyl acetate-ethylene copolymer, vinyl acrylic copolymer that includes styrene, acrylic styrene copolymer, and combinations thereof. In a refinement, the film-forming resin that includes a component selected from the group consisting of styrene-butadiene copolymer, a vinyl acetate-ethylene copolymer, vinyl acrylic copolymer that includes styrene, acrylic styrene copolymer, and combinations thereof. In this refinement, the film-forming resin and therefore, the peelable paint composition does not have any polyvinyl butyral (i.e., 0 weight percent of the total weight of the paint composition). Characteristically, the release agent includes a component selected from the group consisting of soy lecithin, a polysiloxane (e.g., a resin or reactive intermediate), silicone polyether, and combinations thereof.

In a variation, the release agent is present in an amount from about 1 to 20 weight percent of the total peelable paint composition, and the film-forming resin is present in an amount from about 40 to 75 weight percent of the total peelable paint composition. Typically, the balance includes one or more paint additives and water.

In general, the weight ratio of film-forming resin to release agent is from about 3:1 to 50:1. In a variation, the release agent is soy lecithin. In a refinement, the weight ratio of film-forming resin to the soy lecithin is from about 10:1 to 30:1. In a further refinement, the weight ratio of film-forming resin to the soy lecithin is at least, in increasing order of preference, 3:1, 4:1, 5:1, 6:1, 7:1, 8:1, 9:1, 10:1, or 15:1. In a further refinement, the weight ratio of film-forming resin to the polysiloxane is at most, in increasing order of preference, 50:1, 40:1, 30:1, 25:1, 20:1, 18:1, 15:1, or 12:1. In another variation, the release agent is a polysiloxane resin. In a refinement, the weight ratio of film-forming resin to the polysiloxane is from about 5:1 to 40:1. In a further refinement, the weight ratio of film-forming resin to the polysiloxane is at least, in increasing order of preference, 3:1, 4:1, 5:1, 6:1, 7:1, 8:1, 9:1, or 10:1. In a further refinement, the weight ratio of film-forming resin to the polysiloxane is at most, in increasing order of preference, 50:1, 40:1, 30:1, 25:1, 20:1, 18:1, 15:1, or 12:1.

In a variation, the film-forming resin is present in an amount from about 30 to 75 percent of the total weight of the peelable paint composition. In a refinement, the film-forming resin is present in an amount of at least, in increasing order of presence, 30 percent, 40 percent, 45 percent, 50 percent, or 55 percent of the total weight of the peelable paint composition. In a further refinement, the film-forming resin is present in an amount of at most, in increasing order of presence, 75 percent, 70 percent, 65 percent, 60 percent, or 55 percent of the total weight of the peelable paint composition.

In another variation, the release agent is present in an amount from about 1 to 20 percent of the total weight of the peelable paint composition. In a refinement, the release agent is present in an amount of at least, in increasing order of presence, 1 percent, 2 percent, 3 percent, 4 percent, 5 percent or 6 percent of the total weight of the peelable paint composition. In a further refinement, the release agent is present in an amount of at most, in increasing order of presence, 20 percent, 15 percent, 12 percent, 10 percent, 8 percent, or 6 percent of the total weight of the peelable paint composition.

In a variation, the peelable paint composition has a low VOC value preferably below 50 g of VOCs per liter of the peelable paint composition. In some refinements, the peelable paint composition includes VOCs in an amount less than, in increasing order of preference, 50 g of VOCs per liter, 40 g of VOCs per liter, 30 g of VOCs per liter, 10 g of VOCs per liter, or 1 g of VOCs per liter.

Advantageously, paint films (i.e., paint coatings) formed from the peelable paint composition adhere well to a multitude of substrates while forming a solid film after curing. As depicted in the FIGURE, a coated substrate 10 includes a peelable film 12 coating a target substrate 14. The paint film 12 can be peeled manually in large pieces 18 by consumer 20 without generating cracks or breaking into small pieces. For the dried coating, consumers can write/draw on it with markers. The peelable paint composition can be tinted and formulated in various sheens from eggshell to semigloss. Applications of the peelable paint composition include, but are not limited to, temporary decoration/color change, color samples provided to customers, surface protection, temporary decorative art, and as a replacement for taping and painting. For example, a painted substrate can be cut and sections removed. In another example, the painted substrate can provide a removable substrate for artistic works and writing.

In a variation, the film-forming resin includes natural rubber. In a refinement, the natural rubber is provided as a latex. In a refinement, the natural rubber is provided as a latex that includes poly (cis-1,4-isoprene) in an amount of about 40 to 80 weight percent of the total weight of the latex. In some refinements, the natural rubber is provided as a latex that includes poly (cis-1,4-isoprene) in an amount of at least in increasing order of preference 35 weight percent, 40 weight percent, 45 weight percent, 50 weight percent, 55 weight percent, or 60 weight percent of the total weight of the latex and at most in increasing order of preference 90 weight percent, 85 weight percent, 80 weight percent, 75 weight percent, 70 weight percent or 65 weight percent of the total weight of the latex. In a refinement, the latex is treated with an agent to remove protein. Therefore, proteins can be present in an amount less than about 3 weight percent of the total weight of the latex. In some refinements, proteins can be present in an amount less than in increasing order of preference 5 weight percent, 3 weight percent, 2 weight percent, 1 weight percent, 0.5 weight percent, or 0.5 weight percent of the total weight of the latex. In some refinement, the molecular weight of the poly (cis-1,4-isoprene) is from about 100,000 to 1,000,000 Daltons. Useful natural rubbers (e.g. CAS No. 9006-04-6) can be obtained from *Hevea brasiliensis* rubber trees The natural rubber can be present in an amount from about 35 to 85 weight percent of the total weight of the peelable paint composition. In some refinements, the natural rubber is present in an amount of at least in increasing order of preference 35 weight percent, 40 weight percent, 45 weight percent, 50 weight percent, 55 weight percent, 65 weight percent of the total weight of the peelable paint composition. In further refinements, the natural rubber is present in an amount of at most in increasing order of preference 90 weight percent, 85 weight percent, 80 weight percent, 75 weight percent, 70 weight percent, or 65 weight percent of the total weight of the peelable paint composition.

As set forth above, the film-forming resin can include an acrylic-styrene copolymer. In a refinement, the acrylic-styrene copolymer is a random copolymer of about 50 to 85 weight percent acrylate and about 50 to 15 weight percent styrene. In a further refinement, the acrylic-styrene copolymer is a random copolymer of about 70 to 80 weight percent acrylate and about 30 to 20 weight percent styrene.

As set forth above, the film-forming resin can include a vinyl acetate-ethylene copolymer. In a refinement, the vinyl acetate-ethylene copolymer is a random copolymer of vinyl acetate and ethylene that includes about 15 to 50 weight percent styrene. In a further refinement, the vinyl acetate-ethylene copolymer is a random copolymer of vinyl acetate and ethylene that includes about 20 to 30 weight percent styrene.

As set forth above, the film-forming resin can include a styrene-butadiene copolymer. In a refinement, the styrene-butadiene copolymer is a random copolymer of about 50 to 85 weight percent butadiene and about 50 to 15 weight percent styrene. In a further refinement, the styrene-butadiene copolymer is a random copolymer of about 70 to 80 weight percent butadiene and about 30 to 20 weight percent styrene.

As set forth above, the peelable paint composition can include a polysiloxane resin. Typically, the polysiloxane is a reactive polysiloxane resin. Moreover, the polysiloxane can be a nonionic, solvent-free, water-dilutable emulsion of a reactive polysiloxane. In this regard, the polysiloxane can be completely miscible with water. In a refinement, the polysiloxane can include polysiloxane with functional groups and polyglycol ether groups (e.g., a polyether functional polydimethylsiloxane). Examples of such functional groups attached to a polysiloxane moiety are amino, hydroxyl, carboxylate, carbamate, halo (e.g., Cl, Br, etc.) and the like. Moreover, the functional group can be separated from the polysiloxane moiety by a $C_{1-20}$ alkyl group (formally referred to as a dialkylenyl group or radical). In a specific example, the polysiloxane includes a polyether functional polydimethylsiloxane or an organosiloxanyl with polyalkylene glycol. Advantageously, the polysiloxane induces the smoothness on the top surface and further reduces adhesion on the substrate, which fixes the tackiness on top surface and further weakens the adhesion on the substrate for the dried film.

In some variations, the peelable paint composition can include one or more paint additives. Examples of the one or more paint additives are selected from the group consisting of pigment extenders, matting agents, rheology modifiers, surfactants, defoamers, organic solvents, pH adjusters, UV stabilizers, dispersants (e.g., pigment dispersants), coalescents, biocides, matting agents, opaque polymers, thickeners, mildewcides, and the like, and combinations thereof. It should be appreciated that any combination of these paint additives can be used. It should also be appreciated that each specific additive may refer to a combination of such additives. Typically, each paint additive is independently present in an amount from about 0.01 to 10 weight percent of the total weight of the peelable paint composition. In some refinements, each paint additives is independently present in an amount of at least 0.01, 0.1, 0.5, 1, 2, 3, 4, or 5 and at most 20, 15, 13, 12, 10, 9, 7, or 6 weight percent of the total weight of the peelable paint composition.

The one or more paint additives impart a number of useful properties to the peelable paint composition. For example, the peelable paint composition can include a low shear rheology modifier and a high shear rheology modifier. The rheology modifiers include high shear ICI driver and low shear KU drivers provide the desired application performance for the wet paint during rolling and brushing. For the eggshell formula, the pigment extender lowers the sheen. Surfactants offer surface wetting performance and defoamers remove foam after application and reduces process foam during batch making.

In another variation, the peelable paint composition includes titanium oxide (i.e., $TiO_2$). Advantageously, the titanium oxides provide a scattering effect for hiding. In a variation, the titanium oxide is present in an amount from about 3 to 15 weight percent of the total weight of the peelable paint composition.

In another variation, the peelable paint composition can be used to form a basecoat. In this variation, the film-forming resin can be vinyl acrylic copolymer that includes styrene, acrylic-styrene copolymer, or combinations thereof. In a refinement, the film-forming resin does not include polyvinyl butyral (i.e., 0 weight percent). Table 1 provides an exemplary composition for a peelable paint composition that is useful for forming a basecoat on a substrate.

TABLE 1

| Exemplary Peelable Basecoat Paint Composition. | |
| --- | --- |
| Ingredient | Weight % |
| Acrylic polymer with increased stryrene content | 59.78% |
| Water | 30.56% |
| Release Agent | 2.87% |
| Extender Pigment | 1.72% |
| High Shear Rheology modifier | 2.29% |
| Low Shear Rheology modifier | 1.15% |
| Dispersant | 0.57% |
| Surfactant | 0.57% |
| Defoamer | 0.46% |
| Coalescent | 0.34% |
| Neutralizer | 0.23% |

It should be appreciated that the present variation can be practiced within a range of plus or minus 50 percent of the values indicated rounded to or truncated to two significant figures of the values provided in Table 1. In a refinement, the present variation can be practiced within a range of plus or minus 30 percent of the values indicated rounded to or truncated to two significant figures of the values provided in Table 1. In still another refinement, the present variation can be practiced within a range of plus or minus 10 percent of the values indicated rounded to or truncated to two significant figures of the values provided in Table 1.

In another embodiment, a peelable paint composition for forming a peelable coating on a substrate is provided. The peelable paint composition includes natural rubber as a film-forming resin, a polysiloxane; and water. In a refinement, the polysiloxane is a polysiloxane defoamer. IN a further refinement, the polysiloxane defoamer is present in an amount from about 0.1 to 2 weight percent of the total weight of the peelable paint composition. In another variation, the polysiloxane is a release agent (e.g., polydimethylsiloxane). In a refinement, the release agent is present in an amount from about 2 to 12 weight percent of the total weight of the peelable paint composition.

As set forth above, the natural rubber is provided as a latex. In a refinement, the natural rubber is provided as a latex that includes poly (cis-1,4-isoprene) in an amount of about 40 to 80 weight percent of the total weight of the latex. In some refinements, the natural rubber is provided as a latex that includes poly (cis-1,4-isoprene) in an amount of at least in increasing order of preference 35 weight percent, 40 weight percent, 45 weight percent, 50 weight percent, 55 weight percent, or 60 weight percent of the total weight of the latex and at most in increasing order of preference 90 weight percent, 85 weight percent, 80 weight percent, 75 weight percent, 70 weight percent or 65 weight percent of the total weight of the latex. In a refinement, the latex is treated with an agent to remove protein. Therefore, proteins can be present in an amount less than about 3 weight percent of the total weight of the latex. In some refinements, proteins can be present in an amount less than in increasing order of preference 5 weight percent, 3 weight percent, 2 weight percent, 1 weight percent, 0.5 weight percent, or 0.5 weight percent of the total weight of the latex. In some refinement, the molecular weight of the poly (cis-1,4-isoprene) is from about 100,000 to 1,000,000 Daltons. Useful natural rubbers (e.g. CAS No. 9006-04-6) can be obtained from *Hevea brasiliensis* rubber trees As set forth above, the natural rubber can be present in an amount from about 35 to 85 weight percent of the total weight of the peelable paint composition. In some refinements, the natural rubber is present in an amount of at least in increasing order of preference 35 weight percent, 40 weight percent, 45 weight percent, 50 weight percent, 55 weight percent, 65 weight percent of the total weight of the peelable paint composition. In further refinements, the natural rubber is present in an amount of at most in increasing order of preference 90 weight percent, 85 weight percent, 80 weight percent, 75 weight percent, 70 weight percent, or 65 weight percent of the total weight of the peelable paint composition.

As described above, the peelable paint composition of the present embodiment can also include one or more paint additives. Examples of the one or more paint additives are selected from the group consisting of pigment extenders, matting agents, rheology modifiers, surfactants, defoamers, organic solvents, pH adjusters, UV stabilizers, dispersants (e.g., pigment dispersants), coalescents, biocides, matting agents, opaque polymers, thickeners, mildewcides, and the like, and combinations thereof. It should be appreciated that any combination of these paint additives can be used. It should also be appreciated that each specific additive may refer to a combination of such additives. Typically, each paint additive is independently present in an amount from about 0.01 to 10 weight percent of the total weight of the peelable paint composition. In some refinements, each paint additives is independently present in an amount of at least 0.01, 0.1, 0.5, 1, 2, 3, 4, or 5 and at most 20, 15, 13, 12, 10, 9, 7, or 6 weight percent of the total weight of the peelable paint composition.

The one or more paint additives impart a number of useful properties to the peelable paint composition. For example, the peelable paint composition can include a low shear rheology modifier and a high shear rheology modifier. The rheology modifiers include high shear ICI driver and low shear KU drivers provide the desired application performance for the wet paint during rolling and brushing. For the eggshell formula, the pigment extender lowers the sheen. Surfactants offer surface wetting performance and defoamers remove foam after application and reduces process foam during batch making.

In another variation, the peelable paint composition includes titanium oxide (i.e., $TiO_2$). Advantageously, the titanium oxides provide a scattering effect for hiding. In a variation, the titanium oxide is present in an amount from about 3 to 15 weight percent of the total weight of the peelable paint composition.

In another variation, peelable paint composition can be used to form an architectural coating. In this variation, the film-forming resin can be styrene-butadiene copolymer, polyvinyl butyral, a vinyl acetate-ethylene copolymer, and combinations thereof. In a refinement, the film-forming resin can be styrene-butadiene copolymer, a vinyl acetate-ethylene copolymer, and combinations thereof while not including any polyvinyl butyral.

In another embodiment, a method for applying the peelable paint compositions set forth above is provided. The method includes a step of applying a peelable paint composition to a target substrate (e.g., architectural walls) to form a coated substrate and allowing the coated substrate to dry. It should be appreciated that the present embodiment is not limited by the method of applying the peelable paint composition. For example, the peelable paint composition can be applied by such methods as the application with a paint roller, application with a paintbrush, and by spraying. In a refinement, the peelable paint compositions can be applied to surfaces coated with premium paints such as Behr's BUI white flat 1750, white semigloss 3750, Marquee white flat 1450, deep flat 1453, medium satin 7754, white semigloss 3450, and deep semigloss 3453. After drying, the coating has good adhesion on the substrate that it will not fall apart by itself unless it is peeled manually. When peeled, the coating has good tensile strength, such as the paint coating will not crack, and a large continuous piece of film is pulled away from the surface without break. (see the FIGURE described above).

In a variation, the paint composition set forth above is made by a two-step process—the mill (the grind) and the letdown. In the mill step, the solvent (water), dispersant, defoamer, and pigments are mixed together with large shear forces. In the letdown step, film-forming resin, the mildewcide, if present, the rheology modifier, if present, and the biocide, if present, are added to the grind product.

The following examples illustrate the various embodiments of the present invention. Those skilled in the art will recognize many variations that are within the spirit of the present invention and scope of the claims.

1. Peelable Basecoat Compositions

Tables 2 and 3 provide compositions for a peelable paint composition for making basecoats (i.e., peelable basecoat compositions). Test coatings are made by applying Blue Painter's Tape to mark off seven 2"×2" squares to a primed Upson Board with a topcoat made from one of the following paint compositions PR105, PR310, PR313N, PP 1050, PP 3050, or MQI 2450. A thick, single coat of the peelable basecoat composition is applied to four of the tapped off squares and allowed to dry overnight at room temperature (a second coat was applied between 2-4 hours after first coat). A single coat of each chosen color is applied to the remaining 3 squares on the board and allow to dry overnight at room temperature. In this experiment, we chose paints: color 1 (Flat White base), Color 2 (Semi-gloss Medium), and Color 2 (Semi-Gloss Deep).

TABLE 2.1

Example 1 of a peelable basecoat (Semi-Gloss Sheen) composition having a film-forming resin that includes Vinyl Acrylic with increased styrene content

| | Ingredient | Weight Percent |
|---|---|---|
| Grind | Water | 8.61% |
| | Wetting Agent | 0.57% |
| | Defoamer | 0.23% |
| | High Shear Rheology Modifier | 1.15% |
| | Wetting Agent | 0.57% |
| | Pigment | 1.72% |
| | pH Adjuster | 0.23% |
| | Release agent | 2.87% |
| | Water | 13.41% |
| Letdown | Vinyl Acrylic with increased styrene content resin | 59.71% |
| | Defoamer | 0.23% |
| | Water | 6.32% |
| | High Shear Rheology Modifier | 0.57% |
| | Coalescent | 0.34% |
| | Low Shear Rheology Modifier | 3.45% |

TABLE 2.2

Breakdown for the composition of Table 2.1

| | |
|---|---|
| Total VOCs | 19.41 |
| Volume % Solids | 35.75 |
| Weight % Solids | 38.37 |
| PVC | 1.91 |

TABLE 3.1

Example 2 of a peelable basecoat composition (Semi-Gloss) that includes vinyl acetate-ethylene as a film-forming resin.

| | Ingredient | Weight Percent |
|---|---|---|
| Grind | Water | 8.43% |
| | Wetting Agent | 0.56% |
| | Defoamer | 0.22% |
| | Low Shear Rheology Modifier | 1.12% |
| | Wetting Agent | 0.56% |
| | Pigment | 1.69% |
| | pH adjuster | 0.22% |
| | Release agent | 2.81% |
| | Water | 8.47% |
| Letdown | Vinyl acetate ethylene resin | 66.30% |
| | Defoamer | 0.22% |
| | Water | 4.88% |
| | Low Shear Rheology Modifier | 0.56% |
| | Coalescent | 0.34% |
| | High Shear Rheology Modifier | 3.60% |

TABLE 3.2 breakdown for the composition of Table 3.1

| | |
|---|---|
| Total VOCs | 15.99 |
| Volume % Solids | 35.88 |
| Weight % Solids | 40.08 |
| PVC | 1.90 |

TABLE 4

Color Match and Gloss on various substrates for a film-forming resin that includes vinyl acrylic with increased styrene content

| Color Match and Gloss | | 2" × 2" square | Color 1 (Flat White base) | Color 2 (Semi-gloss Medium) | Color 2 (Semi-Gloss Deep) |
|---|---|---|---|---|---|
| 3050 | Single Coat | Color Difference (ΔE) | 0.20 +/− 0.02[1] | 0.21 +/− 0.05[1] | 0.29 +/− 0.22[1] |
| | | Peelable TC Gloss (20°/60°/85°) | 0.9/4.3/3.8[2] | 13.4/45.5/64.0[2] | 7.8/35.0/60.2[3] |
| | | Control Gloss (20°/60°/85°) | 0.9/4.0/3.6[2] | 11.7/48.5/65.6[2] | 8.4/39.4/54.3[3] |
| | Double Coat | Color Difference (ΔE) | 0.19 +/− 0.09[1] | 0.35 +/− 0.17[1] | 0.71 +/− 0.2[1] |
| | | Peelable TC Gloss (20°/60°/85°) | 0.9/4.4/4.2[2] | 11.1/54.3/74.3[2] | 5.5/40.6/61.3[3] |
| | | Control Gloss (20°/60°/85°) | 0.9/4.4/3.9[2] | 13.1/50.9/66.1[2] | 7.7/41.9/61.1[3] |
| PR105 | Single Coat | Color Difference (ΔE) | 0.07 +/− 0.04[1] | 0.31 +/− 0.03[1] | 0.25 +/− 0.17[1] |
| | | Peelable TC Gloss (20°/60°/85°) | 0.9/4.4/4.1[2] | 14.6/51.9/70.9[2] | 12.0/44.9/60.3[2] |
| | | Control Gloss (20°/60°/85°) | 0.9/4.0/3.7[2] | 7.5/41.7/56.0[3] | 5.3/32.1/44.1[3] |
| | Double Coat | Color Difference (ΔE) | 0.16 +/− 0.041 | 0.18 +/− 0.051 | 0.54 +/− 0.531 |
| | | Peelable TC Gloss (20°/60°/85°) | 0.9/4.4/4.92 | 16.5/60.2/84.33 | 9.5/48.7/73.32 |
| | | Control Gloss (20°/60°/85°) | 0.9/4.0/3.92 | 9.9/45.6/62.82 | 7.2/40.1/59.43 |

[1]Consistent topcoat color difference in the single coat vs double coat
[2]Gloss is good for MQI1450 and majority of MQI 3454
[3]consistently low gloss for MQI 3453

TABLE 5

Color Match and Gloss film-forming resin that includes vinyl acetate ethylene.

| Color Match and Gloss | | 2" × 2" square | Color 1 (Flat White base) | Color 2 (Semi-gloss Medium) | Color 2 (Semi-Gloss Deep) |
|---|---|---|---|---|---|
| 3050 | Single Coat | Color Difference (ΔE) | 0.07 +/− 0.01[1] | 0.18 +/− 0.04[1] | 0.47 +/− 0.21[1] |
| | | Peelable TC Gloss (20°/60°/85°) | 0.9/4.2/3.8[2] | 16.2/51.8/64.8[2] | 7.8/35.0/60.2[3] |
| | | Control Gloss (20°/60°/85°) | 0.9/4.0/3.6[2] | 11.7/48.5/65.6[2] | 8.4/39.4/54.3[3] |
| | Double Coat | Color Difference (ΔE) | 0.10 +/− 0.05[1] | 0.11 +/− 0.03[1] | 0.085 +/− 0.005[1] |
| | | Peelable TC Gloss (20°/60°/85°) | 0.9/4.4/4.9[2] | 15.5/57.0/76.3[2] | 6.4/47.2/65.7[2] |
| | | Control Gloss (20°/60°/85°) | 0.9/4.4/3.9[2] | 13.1/50.9/66.1[2] | 7.7/41.9/61.1[3] |
| PR105 | Single Coat | Color Difference (ΔE) | 0.21 +/− 0.01[1] | 0.19 +/− 0.04[1] | 0.13 +/− 0.04[1] |
| | | Peelable TC Gloss (20°/60°/85°) | 0.9/4.2/4.0[2] | 10.6/44.8/59.7[2] | 5.1/25.1/37.9[3] |
| | | Control Gloss (20°/60°/85°) | 0.9/4.0/3.7[2] | 7.5/41.7/56.0[3] | 5.3/32.1/44.1[3] |
| | Double Coat | Color Difference (ΔE) | 0.12 +/− 0.04[1] | 0.10 +/− 0.04[1] | 0.25 +/− 0.04[1] |
| | | Peelable TC Gloss (20°/60°/85°) | 0.9/4.4/5.2[2] | 13.3/56.2/77.3[2] | 7.6/47.1/73.0[2] |
| | | Control Gloss (20°/60°/85°) | 0.9/4.0/3.9[2] | 9.9/45.6/62.8[2] | 7.2/40.1/59.4[3] |

[1]Consistent topcoat color difference in the single coat vs double coat (all values <0.5)
[2]Gloss is good for MQI1450 and majority of MQI 3454
[3]consistently low gloss for MQI 3453

TABLE 6

Peelability for a film-forming resin that includes vinyl acrylic with increased styrene content

| Color Match and Gloss | | 2" × 2" square | Basecoat Only | Color 1 (Flat White base) | Color 2 (Semi-gloss Medium) | Color 2 (Semi-Gloss Deep) |
|---|---|---|---|---|---|---|
| 3050 | Single Coat | Dry Film Thickness | 6.5[1] | 15[1] | 10[1] | 10.5[1] |
| | | Color Transfer ΔE | n/a | 0.28[2] | 0.79[2] | 0.55[2] |
| | | Peelability 0-5, 5 = excellent | 3[3] | 4[3] | 5[3] | 4[3] |
| | | Additional Comments | DS, fragile film[3] | DS, Good peel, pieces[3] | DS, good peel[3] | DS, good peel[3] |
| | Double Coat | Dry Film Thickness | 10[1] | 18[1] | 20[1] | 16.5[1] |
| | | Color Transfer ΔE | n/a | 0.51[2] | 0.71[2] | 1.00[2] |
| | | Peelability 0-5, 5 = excellent | 2[3] | 3[3] | 3.5[3] | 4[3] |
| | | Additional Comments | Good peel; fragile film[3] | Good peel; intercoat failure[3] | Perfect peel; strong film[3] | Perfect peel; strong film[3] |
| PR105 | Single Coat | Dry Film Thickness | 7[1] | 16.5[1] | 15[1] | 16[1] |
| | | Color Transfer ΔE | n/a | 0.76[2] | 1.08[2] | 0.57[2] |
| | | Peelability 0-5, 5 = excellent | 2[3] | 3[3] | 3.5[3] | 4[3] |
| | | Additional Comments | DS, fragile film, small pieces[3] | DS, okay peel, fragile film[3] | DS, good peel, slight pigment pull[3] | DS, good peel, slight pigment pull[3] |
| | Double Coat | Dry Film Thickness | 10[1] | 19.5[1] | 19.5[1] | 19[1] |
| | | Color Transfer ΔE | n/a | 0.84[2] | 0.55[2] | 0.9[2] |
| | | Peelability 0-5, 5 = excellent | 2[3] | 2.5[3] | 3[3] | 4[3] |
| | | Additional Comments | Fragile Film, DS[3] | Fragile film, rips easily[3] | Good Peel[3] | Good peel, minor Pigment pull[3] |

[1]Single Coat Avg. = 13.8 mil, Two Coat Avg. = 18.3 mil
[2]Maintain excellent color transfer values
[3]Maintain moderate to great peelability; DS means difficult to start.

TABLE 7

| Color Match and Gloss | | 2" × 2" square | Basecoat Only | Color 1 (Flat White base) | Color 2 (Semi-gloss Medium) | Color 2 (Semi-Gloss Deep) |
|---|---|---|---|---|---|---|
| 3050 | Single Coat | Dry Film Thickness | 5 | 12 | 14.5 | 14.5 |
| | | Color Transfer ΔE | n/a | 0.49 | 0.41 | 0.51 |
| | | Peelability 0-5, 5 = excellent | 2.5 | 3 | 5 | 4 |
| | | Additional Comments | DS, peels in small pieces | DS, good film strength, More force needed | Excellent Peel | good peel, good film strength |
| | Double Coat | Dry Film Thickness | 10[1] | 17[1] | 14.5[1] | 14.5[1] |
| | | Color Transfer ΔE | n/a | 0.71[2] | 0.48[2] | 0.37[2] |
| | | Peelability 0-5, 5 = excellent | 5[3] | 5[3] | 5[3] | 5[3] |
| | | Additional Comments[3] | Perfect peel, great film strength[3] | Perfect peel, great film strength[3] | Perfect peel, great film strength[3] | Perfect peel, great film strength[3] |
| PR105 | Single Coat | Dry Film Thickness | 6.5[1] | 14.5[1] | 12[1] | 19[1] |
| | | Color Transfer ΔE | n/a | 1.25[2] | 0.8[2] | 0.75[2] |
| | | Peelability 0-5, 5 = excellent | 3.5[3] | 4[3] | 4[3] | 5[3] |
| | | Additional Comments | DS, rips the film a bit, decent peel[3] | DS, good peel, okay film strength[3] | DS, good peel, good film strength[3] | DS, good peel, good film strength[3] |
| | Double Coat | Dry Film Thickness | 9.5[1] | 20[1] | 14[1] | 18[1] |
| | | Color Transfer ΔE | n/a | 0.89[2] | 0.77[2] | 0.74[2] |
| | | Peelability 0-5, 5 = excellent | 4[3] | 5[3] | 5[3] | 5[3] |
| | | Additional Comments | Easy to peel, Strong, minor Pigment pull[3] | Strong peel, minor pigment pull[3] | Strong peel, Minor Pigment pull[3] | Strong peel, minor pigment pull[3] |

[1]Single Coat Avg. = 14.4 mil, Two Coat Avg. = 16.3 mil
[2]Maintain excellent color transfer values
[3]Maintain moderate to great peelability; DS means difficult to start.

The results presented in Tables 4 to 7 demonstrate that the peelable basecoat paint composition can achieve a consistent gloss, color match, and color transfer for a single coat. The single coat produces thinner films that are more difficult to start the peel. However, the single-coat example peels nicely after being started. The two-coat examples demonstrate consistent gloss, color match, and color transfer. Two-coat example produced thicker, stronger films in which the peel is easier to start.

1.1 Additional Architectural Paint Coating Compositions

Additional examples in Tables 8 and 9 provides additional peelable paint compositions. It should be appreciated that the present variation can be practiced within a range of plus or minus 50 percent of the values indicated rounded to or truncated to two significant figures of the values provided in Tables 8 and 9. In a refinement, the present variation can be practiced within a range of plus or minus 30 percent of the values indicated rounded to or truncated to two significant figures of the values provided in Tables 8 and 9. In still another refinement, the present variation can be practiced within a range of plus or minus 10 percent of the values indicated rounded to or truncated to two significant figures of the values provided in Table 8 to 9.

TABLE 8

Example 3 Eggshell White Paint

| Ingredients | Weight % |
|---|---|
| Acrylic polymer with increased styrene content | 36.00% |
| TiO2 slurry | 26.19% |
| Water | 13.91% |
| Pigments | 8.78% |
| Opaque Polymer | 4.68% |

TABLE 8-continued

Example 3 Eggshell White Paint

| Ingredients | Weight % |
|---|---|
| Peel Additive 2 (polydimethylsiloxane) | 3.74% |
| High Shear Rheology Modifier | 1.88% |
| Dispersant | 1.03% |
| Peel Additive 1 Controlled flocculating wetting and dispersing agent | 0.94% |
| Coalescent | 0.94% |
| Low shear rheology modifier | 0.79% |
| Surfactant | 0.47% |
| Defoamer | 0.46% |
| Neutralizer | 0.19% |
| PVC | 32.93 |

Comment: Great Peel, Good TS, gloss close to spec

TABLE 9

Example 4 Eggshell Deep Paint

| Ingredients | Weight % |
|---|---|
| Acrylic polymer with increased styrene content | 47.61% |
| Water | 22.70% |
| Pigments | 14.70% |
| Peel Additive 2 - polydimethylsiloxane | 8.46% |
| High Shear Rheology Modifier | 2.11% |
| Peel Additive 1 - Controlled flocculating wetting and dispersing agent | 1.06% |
| Low Shear Rheology Modifier | 0.79% |
| Defoamer | 0.64% |
| Opaque Polymers | 0.63% |
| Dispersant | 0.53% |
| Surfactant | 0.32% |
| Cellulosic thickener | 0.21% |

TABLE 9-continued

| Example 4 Eggshell Deep Paint | |
| --- | --- |
| Ingredients | Weight % |
| Neutralizer | 0.21% |
| PVC | 15.41 |

Comments: Great Peel from All Substrates

2. Architectural Paint Composition.

Tables 10 to 14 provides peelable paint composition for making architectural coatings. It should be appreciated that the present variation can be practiced within a range of plus or minus 50 percent of the values indicated rounded to or truncated to two significant figures of the values provided in Tables 10-14. In a refinement, the present variation can be practiced within a range of plus or minus 30 percent of the values indicated rounded to or truncated to two significant figures of the values provided in Tables 10-14. In still another refinement, the present variation can be practiced within a range of plus or minus 10 percent of the values indicated rounded to or truncated to two significant figures of the values provided in Table 10-14.

TABLE 10

| Example 5 Flat White Paint Composition | |
| --- | --- |
| Ingredients | Weight % |
| Water | 7.44 |
| Rutile titanium dioxide slurry | 17.56 |
| Dispersant | 0.92 |
| Defoamer | 0.35 |
| Wetting Agent | 0.26 |
| pH adjuster | 0.18 |
| Pigment | 0.39 |
| Pigment | 4.39 |
| Pigment | 19.32 |
| Biocide | — |
| High Shear Rheology Modifier) | 1.76 |
| Vinyl Acrylic Resin with increased styrene content | 37.76 |
| Coalescent | 0.88 |
| Opaque Polymer | 4.39 |
| Peel additive - polydimethylsiloxane | 3.95 |
| Low Shear Rheology Modifier | 0.31 |
| Low Shear Rheology Modifier | 0.13 |

TABLE 11

| Examples 6 Eggshell White Paint Compositions | | |
| --- | --- | --- |
| | Ingredients | Weight % |
| Grind | Water | 13.68 |
| | Dispersant | 1.08 |
| | | — |
| | | — |
| | Surfactant | 0.46 |
| | | — |
| | pH Adjuster | 0.18 |
| | | — |
| | Defoamer | 0.05 |
| | Pigment | 0.37 |
| | | 7.39 |
| | | 4.62 |
| Letdown | Slurry | 23.10 |
| | Vinyl Acrylic Resin with increased styrene content | 36.96 |
| | Defoamer | 0.18 |
| | | — |
| | High Shear Rheology Modifier | 1.85 |
| | Coalescent | 0.92 |
| | Opaque Polymer | 4.62 |

TABLE 11-continued

| Examples 6 Eggshell White Paint Compositions | |
| --- | --- |
| Ingredients | Weight % |
| Low Shear Rheology Modifier | 0.46 |
| | 0.37 |
| Peel Additive (polydimethylsiloxane) | 3.70 |

TABLE 12

| Examples 7-8 Semigloss Paint Compositions (White or Deep Bases) | | |
| --- | --- | --- |
| Description | Example 7 SG White Weight % | Example 8 SG Deep Weight % |
| Viscosity Modifier | — | 0.68 |
| High Shear Rheology Modifier | 0.768861 | 1.13 |
| Defoamer | 0.096108 | 0.23 |
| Wetting Agent | 0.480538 | 0.57 |
| Wetting Agent | 0.288323 | 0.57 |
| Wetting Agent | — | — |
| Pigment | — | 2.27 |
| Pigment | 29.79337 | — |
| Pigment | 0.961076 | 0.57 |
| pH adjuster | 0.192215 | 0.23 |
| Water | 12.68621 | 14.73 |
| Vinyl Acrylic Resin with increased styrene content | 41.33 | 62.34 |
| Low Shear Rheology Modifier | — | — |
| Low Shear Rheology Modifier | 0.96 | 1.13 |
| Low Shear Rheology Modifier | 0.14 | 0.34 |
| High Shear Rheology Modifier | 1.35 | 1.13 |
| Low Shear Rheology Modifier | — | 0.23 |
| Defoamer | — | 0.45 |
| Defoamer | 0.38 | — |
| Pigment | 0.96 | 1.13 |
| Solvent | 0.96 | 1.13 |
| Water | 4.32 | 6.61 |
| Peel Additive (polydimethylsiloxane) | 4.32 | 4.53 |

TABLE 13

| Examples 9-10 High Sheen Paint Compositions | | |
| --- | --- | --- |
| Description | Example 9 High Sheen Pigmented | Example 10 High Sheen No TiO2 Pigment *Also used as basecoat formula |
| Water | 19.22 | 20.99 |
| TiO2 | 16.83 | |
| High Shear Rheology Modifier | 0.84 | 2.49 |
| Nonionic Alkoxylated Surfactant | 0.53 | 0.12 |
| Neutralizing agent | 0.21 | 0.15 |
| Anionic Dispersant Of Ammonium Salt Hydrophobic Copolymer | 0.84 | 0.25 |
| Polysiloxane Defoamer | 0.21 | 0.25 |
| Clay Thickener | 0.42 | 0.62 |
| Kaolin Pigment | 1.05 | |
| Nepheline Syenite Pigment | 0.84 | |
| In-Can Biocide | 0.03 | 0.04 |
| In-Can Biocide | 0.26 | 0.39 |
| Zno Pigment | 0.02 | 0.12 |
| Mineral Oil Defoamer | 0.84 | |
| In-Can Biocide | 0.11 | 0.1 |
| Opaque Polymer | 2.1 | 1.87 |
| Plasticizer | 2.63 | |
| Polydimethylsiloxane Release Agent | 6.31 | |
| HEUR-Low Shear Rheology Modifier | 0.42 | 1 |
| Natural Rubber Latex | 46.28 | 70.98 |
| Cellulose Rheology Modifier | | 0.25 |

19

TABLE 13-continued

Examples 9-10 High Sheen Paint Compositions

| Description | Example 9 High Sheen Pigmented | Example 10 High Sheen No TiO2 Pigment *Also used as basecoat formula |
|---|---|---|
| Polyether Siloxane Defoamer | | 0.25 |
| HEUR-Low Shear Rheology Modifier | | 0.12 |

TABLE 14

Examples 11-12 Low Sheen Paint Compositions

| Description | Example 11 Low Sheen Pigmented | Example 12 Low Sheen No TiO2 Pigment |
|---|---|---|
| TiO2 | 19.91 | |
| High Shear Rheology Modifier | 2.99 | 2.63 |
| Nonionic Alkoxylated Surfactant | 0.6 | 0.48 |
| Neutralizing Agent | | |
| Anionic Dispersant Of Ammonium Salt | 0.9 | 0.72 |
| Hydrophobic Copolymer | | |
| Polysiloxane Defoamer | 0.4 | 0.24 |
| Clay Thickner | 0.2 | 0.6 |
| Kaolin Pigment | | |
| Nepheline Syenite Pigment | 4.98 | 2.39 |
| In Can Biocide | 0.03 | 0.04 |
| In Can Biocide | 0.26 | 0.31 |
| Zno Pigment | 0.05 | 0.12 |
| In Can Biocide | 0.08 | 0.1 |
| Opaque Polymer | | 1.79 |
| HEUR-Low Shear Rheology Modifier | | 1.2 |
| Neutralizing Agent | 0.2 | |
| Diatomaceous Earth | 1.99 | 2.39 |
| Natural Rubber Latex | 40.82 | 60.96 |
| Cellulose Rheology Modifier | 0.25 | 0.24 |
| HEUR-Low Shear Rheology Modifier | 1.19 | |
| Silicon Dioxide | | 1.2 |
| Polyether Siloxane Defoamer | | 0.24 |
| HEUR-Low Shear Rheology Modifier | | 1.08 |
| Neutralizing Agent | | 0.24 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A peelable paint composition for forming a peelable coating on a substrate, the peelable paint composition comprising:

soy lecithin as a release agent;

a film-forming resin that includes a component selected from the group consisting of natural rubber, styrene-butadiene copolymer, polyvinyl butyral, a vinyl acetate-ethylene copolymer, acrylic styrene copolymer, and combinations thereof; and water.

2. The peelable paint composition of claim 1 wherein the weight ratio of the film-forming resin to the release agent is from about 3:1 to 50:1.

3. The peelable paint composition of claim 1 wherein the film-forming resin is present in an amount from about 30 to 75 percent of the total weight of the peelable paint composition.

4. The peelable paint composition of claim 1 wherein the release agent is present in an amount from about 1 to 8 percent of the total weight of the peelable paint composition.

5. The peelable paint composition of claim 1, wherein the film-forming resin includes natural rubber.

6. The peelable paint composition of claim 5 wherein the natural rubber is provided as a latex that includes poly (cis-1,4-isoprene) in an amount of about 40 to 80 weight percent of the total weight of the latex.

7. The peelable paint composition of claim 6 wherein the latex is treated with an agent to remove protein.

8. The peelable paint composition of claim 5 wherein the natural rubber is present in an amount from about 35 to 85 weight percent of the total weight of the peelable paint composition.

9. The peelable paint composition of claim 1 wherein the film-forming resin includes a component selected from the group consisting of styrene-butadiene copolymer, a vinyl acetate-ethylene copolymer, vinyl acrylic copolymer that includes styrene, acrylic styrene copolymer, and combinations thereof and wherein the peelable paint composition does not include any polyvinyl butyral.

10. The peelable paint composition of claim 1, wherein a weight ratio of the film-forming resin to the soy lecithin is 10:1 to 30:1.

11. The peelable paint composition of claim 1, wherein the acrylic styrene copolymer each includes 15 to 50 weight percent styrene.

12. The peelable paint composition of claim 1, wherein the film-forming resin includes styrene-butadiene copolymer.

13. The peelable paint composition of claim 12, wherein the styrene-butadiene copolymer is a random copolymer of about 50 to 85 weight percent butadiene and about 50 to 15 weight percent styrene.

14. The peelable paint composition of claim 1, wherein the release agent is a polysiloxane that includes a polyether functional polydimethylsiloxane.

15. The peelable paint composition of claim 14, wherein the polysiloxane includes polysiloxane with functional groups and polyglycol ether groups.

16. The peelable paint composition of claim 1, further including one or more paint additives.

17. The peelable paint composition of claim 16, wherein the one or more paint additives are selected from the group consisting of titanium oxide, pigment extenders, matting agents, rheology modifiers, surfactants, defoamers, organic solvents, pH adjusters, UV stabilizers, dispersants, coalescents, biocides, matting agents, opaque polymers, thickeners, mildewcides, and combinations thereof.

18. The peelable paint composition of claim 17, wherein the one or more paint additives include a low shear rheology modifier and a high shear rheology modifier.

19. A peelable paint composition for forming a peelable coating on a substrate, the peelable paint composition comprising:

natural rubber as a film-forming resin, wherein the natural rubber is provided as a latex that includes poly (cis-1, 4-isoprene) in an amount of about 40 to 80 weight percent of the total weight of the latex and wherein the latex is treated with an agent to remove protein;

a polysiloxane; and water.

20. The peelable paint composition of claim 19, wherein the polysiloxane is a polysiloxane defoamer.

21. The peelable paint composition of claim 20, wherein the polysiloxane defoamer is present in an amount from about 0.1 to 2 weight percent of the total weight of the peelable paint composition.

22. The peelable paint composition of claim 19, wherein the polysiloxane is a release agent.

23. The peelable paint composition of claim 22, wherein the release agent is a polysiloxane that includes a polyether functional polydimethylsiloxane.

24. The peelable paint composition of claim 22, wherein the polysiloxane includes polysiloxane with functional groups and polyglycol ether groups.

25. The peelable paint composition of claim 22, wherein the polysiloxane is a polydimethylsiloxane.

26. The peelable paint composition of claim 22, wherein the release agent is present in an amount from about 2 to 12 weight percent of the total weight of the peelable paint composition.

27. The peelable paint composition of claim 19 wherein the natural rubber is provided as a latex that includes poly (cis-1,4-isoprene) in an amount of about 40 to 80 weight percent of the total weight of the latex.

28. The peelable paint composition of claim 19, wherein the natural rubber is present in an amount from about 35 to 85 weight percent of the total weight of the peelable paint composition.

29. The peelable paint composition of claim 19, further comprising one or more paint additives.

30. The peelable paint composition of claim 29, wherein the one or more paint additives are selected from the group consisting of titanium oxide, pigment extenders, matting agents, rheology modifiers, surfactants, defoamers, organic solvents, pH adjusters, UV stabilizers, dispersants, coalescents, biocides, matting agents, opaque polymers, thickeners, mildewcides, and combinations thereof.

31. The peelable paint composition of claim 29, wherein the one or more paint additives includes a low shear rheology modifier and a high shear rheology modifier.

32. A peelable paint composition for forming a peelable coating on a substrate, the peelable paint composition comprising:

natural rubber as a film-forming resin;

a polysiloxane;

one or more paint additives that includes a low shear rheology modifier and a high shear rheology modifier; and water.

* * * * *